Sept. 29, 1953     F. J. PEPERSACK     2,653,780
AIRCRAFT FUEL STORAGE SYSTEM
Filed Feb. 16, 1949
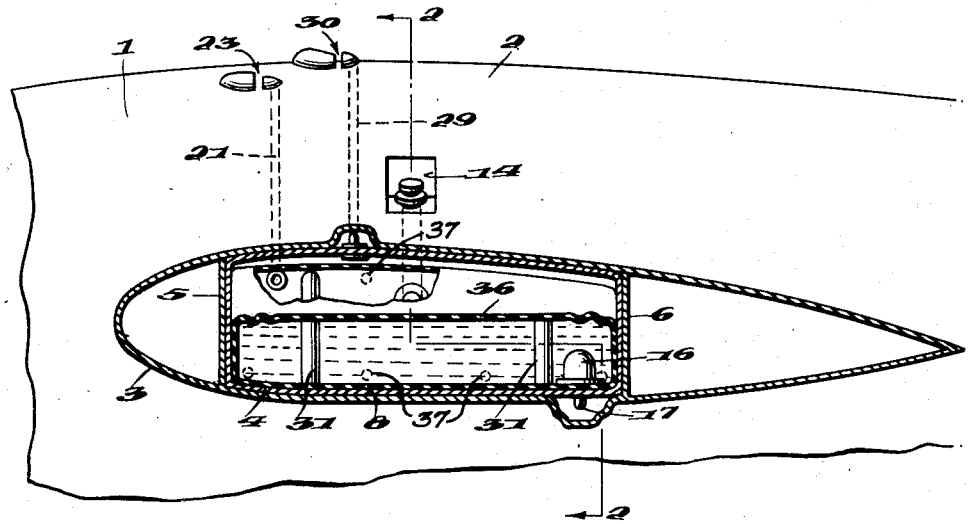
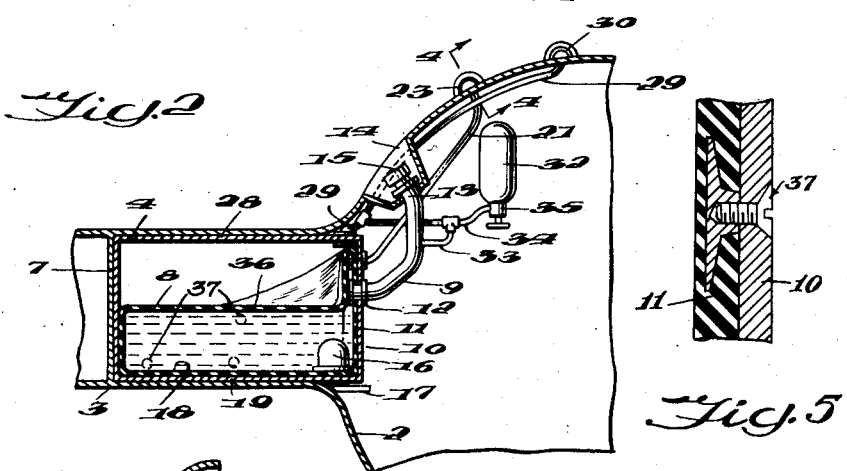
Inventor
FRANCIS J. PEPERSACK,
By Martin E. Hogan Jr.
ATTORNEY Patented Sept. 29, 1953

2,653,780

UNITED STATES PATENT OFFICE 2,653,780

AIRCRAFT FUEL STORAGE SYSTEM

Francis J. Pepersack, Towson, Md., assignor to The Glenn L. Martin Company, Middle River, Md., a corporation of Maryland Application February 16, 1949, Serial No. 76,692

9 Claims. (Cl. 244—135)

This invention relates to an improved fuel storage system especially intended for use in aircraft.

In fuel storage tanks, there is a tendency for fuel to evaporate from the surface of the fuel in the tank and to fill the space thereabove with a highly explosive vapor mixture. This is especially true in aircraft while flying at high elevations where the atmospheric pressure is relatively low. The danger of a fire or an explosion as a result of a spark or a flame in the vicinity of the tank vent or from other causes is obvious under such conditions.

It is an object of this invention to provide an improved fuel storage system which will eliminate or minimize the formation of explosive vapors therein.

It is a further object to provide a fuel tank having a collapsible fuel cell therein so attached to the interior of the tank that certain walls of the cell will tend to collapse and lie directly on the surface of the fuel contained therein.

It is a further object to provide with such a tank, means for applying air under a relatively low positive pressure to the space between the tank and the collapsible cell walls to insure collapse of the cell.

Another object is to provide a vent extending into the interior of the flexible cell above the normal full fuel level, and to provide means for producing a somewhat lower positive pressure therein whereby collapse of the cell walls onto the fuel will be insured by the differential pressure acting upon opposite sides of the cell walls, while, at the same time, a slight pressure will be maintained within any small air spaces remaining within the cell itself to reduce evaporation therein.

A still further object is to provide, under emergency conditions such as during combat, for the discharge of an inert gas under pressure into the air space both exterior and interior of the cell.

Further objects and advantages of this invention will be obvious after a study of the following description and claims.

In the drawing,

Figure 1 is a side view of a portion of an airplane with the wing shown in section to show the fuel tank therein.

Figure 2 is a fragmentary transverse sectional view through the fuselage and wing taken substantially along the line 2—2 in Figure 1.

Figure 3 is an enlarged fragmentary sectional view showing the manner in which the vent lines are connected to the interior of the tank and of the cell, the cell being shown filled to its normal maximum usable capacity, exclusive of expansion space.

Figure 4 is a longitudinal sectional view through one of the pressure producing means on the outside of the fuselage.

Figure 5 is a sectional view showing the manner of attaching the cell walls to the walls of the tank.

The drawings show an airplane 1 having a fuselage 2 and the usual wing 3 extending laterally therefrom. Located within the wing, as clearly shown in Figures 1 and 2, is a fuel tank or container 4 supported between the spars 5 and 6 and the rib 7 of the wing. Obviously, tank 4 could be a portion of the wing structure itself if so desired. In the present case, it is shown, however, as a separate element fitting into a corresponding chamber within the wing. Depending upon the uses for which the airplane is intended, tank 4 may be of the self-sealing type, well known in the art, or of the ordinary metal construction.

Located inside of tank 4 is a flexible fuel cell 8 of rubber-like material and of substantially the same shape and size as the interior of the tank when in its fully extended condition. A filler pipe 9 extends through the inner side walls 10 and 11 of the tank and cell respectively and is fastened therein in liquid-tight relation by suitable fittings 12. The upper end 13 of the filler pipe extends into a pocket 14 formed in the outer surface of the fuselage and adapted to be covered in normal use by a suitable cover plate, not shown. The end of filler pipe 9 is adapted to be sealed by a removable filler cap 15. A suitable booster pump 16 is located inside the cell and has its discharge line 17 extending outwardly through suitable fittings in the bottom walls 18 and 19 of the cell and tank respectively. This discharge line extends in the usual fashion to the motors for supplying fuel thereto.

Communicating with the interior of the fuel cell, adjacent its upper portion, is a vent line 21 connected by suitable fittings 22 to the inner walls of the tank and cell as clearly shown in Figure 3. This vent line 21 extends upwardly along the inside of the fuselage to a point near its upper side and terminates in the pressure producing means 23 mounted on the outside of the fuselage.

As shown in detail in Figure 4, the pressure producing means 23 consists of a housing 24 in communication with the vent line 21 through a suitable opening in the fuselage and having a forwardly directed opening 25. Spaced slightly ahead of opening 25 is a truncated streamlined body of revolution 26 adapted to deflect rain or sleet from the opening 25 and of such shape as to limit the pressure produced by the ram effect in housing 24 to a predetermined value under normal flight conditions. In the present case, this pressure producing means is arranged to cause a pressure head equal to about 5 inches of water to obtain in vent 21 during normal flight speed of the airplane. For a further discussion of this general type of pressure producing means, reference is made to the patent to O'Neal 2,403,749.

Extending through suitable fittings 27 in the top wall 28 of the tank is a pressure line 29 also extending upwardly within the fuselage and terminating in another pressure producing means 30 on the outer surface thereof and so designed as to produce, under normal flight conditions, a pressure within the tank equal to about 10 inches of water.

Attached to the inner wall 11 of cell 8 is a pair of capacitance or hydrostatic fuel quantity gage units 31. Connected to the filler pipe 9 and to the pressure line 29 by pipes 33 and 34 is a pressure reservoir 32 filled with a suitable inert gas under relatively high pressure and controlled by a manually operated valve 35. By manipulation of this valve, the inert gas may be injected into the interior of the tank and cell under emergency conditions, for example, if the plane is about to enter combat.

Approximately one half of the total cell wall is held against movement relative to the tank. This portion of the cell wall, made up of the inner side 11, the bottom 18, and substantially one half of each end wall is connected to the tank by suitable fasteners 37, as well as by the various fittings above mentioned. As indicated in Fig. 5, fasteners 37 may, for example, be of the type shown and described in the patent to Eger No. 2,401,627. Other types of fasteners such as are well known in the art could obviously be substituted without in any way affecting the operation of the system. The remaining half of the cell constitutes a flexible diaphragm or wall portion 36, free to collapse against the fixed walls and to lie upon the surface of the fuel within the cell. The collapsible wall portion is supported only along its periphery as defined by the upper edge of the inner cell wall 11, the outer edge of the bottom wall 18 and diagonal lines extending across the front and rear end walls and connecting said edges.

Figures 1 and 2 show the cell in the semi-collapsed condition that would obtain when the fuel is about half exhausted from the cell. Under these conditions, the major portion of flexible wall 36 will rest in direct contact with the surface of the fuel, although, depending upon the shape of the particular cell and container, there may be small air spaces formed at the inner corners. The surface of the liquid in these air pockets will be, however, relatively small in area and will have a positive air pressure applied thereagainst due to the action of the pressure vent 21 thus tending to reduce evaporation therefrom. Thus, it will be seen that with the fuel system shown, the vapor space above the surface of the fuel will be substantially eliminated.

When the plane is on the ground the collapsible portion of the cell wall will rest of its own weight upon the surface of any fuel remaining in the tank. Vents 21 and 29 will permit the escape of any air from the interior of either the cell or the tank during the filling of the cell with fuel, the flexible portion of cell 8 meanwhile being free to rise with the fuel level until the full tank condition shown in Figure 3 is reached. As soon as the airplane takes off, pressure will be produced both inside and outside the cell, the latter, as above set forth, being the greater to insure that the collapsible cell wall will remain in contact with as much of the surface of the fuel as is possible. As the fuel is used from the cell, the flexible wall portion will continue to collapse until, with the tank entirely empty, it will lie directly against the fixed bottom and inner side walls of the cell.

While a generally rectangular tank has been shown and described, it is believed obvious that the same principles could be applied to tanks of other shapes, the essential feature being that the free wall area of the flexible cell should be of such size as to permit substantially complete collapse against the fixed wall portions when the cell is empty. It is also obvious that other means for producing the positive pressures within the cell and tank could be employed, although the form shown is extremely satisfactory for this purpose due to its light weight and simplicity of construction.

It is to be understood that certain other changes, alterations, modifications, and substitutions can be made without departing from the spirit and scope of the appended claims.

I claim as my invention:

1. Fuel supply means comprising a tank, a collapsible fuel cell within said tank, means attaching a substantial portion of the walls of said cell including the upper portion of one side wall thereof in fixed relation to the corresponding walls of said tank, the remainder of said cell walls being flexible and free to collapse inwardly of the cell against said fixed wall portion, means for supplying fuel to and withdrawing it from said cell, a vent communicating with the interior of said cell through said fixed wall portion adjacent the top thereof, and means communicating with the interior of said tank for building up fluid pressure therein to collapse said cell.

2. Fuel supply means comprising a tank, a collapsible fuel cell within said tank, means attaching a substantial portion of the walls of said cell including the upper portion of one side wall thereof in fixed relation to the corresponding walls of said tank, the remainder of said cell walls being flexible and free to collapse inwardly of the cell against said fixed wall portion, means for supplying fuel to and withdrawing it from said cell, a vent communicating with the interior of said cell through said fixed wall portion adjacent the top thereof, means communicating with the interior of said tank for building up fluid pressure therein to collapse said cell, and means cooperating with said vent to build up a slightly lower fluid pressure within said cell.

3. Fuel supply means comprising a hollow container, means including a flexible wall portion forming a collapsible fuel cell within said container, said flexible wall portion having a surface area substantially equal to one half the inside surface area of said container, means securing the peripheral edges of said flexible wall portion in substantially fixed relationship to the container at diametrically opposite portions thereof adjacent the top of one side wall of the container and the bottom of the opposite wall, means for supplying fuel to and withdrawing it from the interior of said cell, a vent communicating with the interior of said cell adjacent the top of said one side wall, means communicating with the inside of said container but exterior of said cell for producing a fluid pressure therein tending to collapse said cell as fuel is withdrawn therefrom.

4. Fuel storage means comprising a hollow container, a collapsible fuel cell of substantially the same shape and size as the interior of said container, means securing the bottom wall and the upper portion of one side wall of said cell in relatively fixed relation to the corresponding walls of said container, the top wall and the opposite side wall of said cell being flexible and movable to a collapsed position in which they lie in substantial contact with the inner faces of said fixed side and bottom cell walls, fuel supply and discharge means communicating with the interior of said cell through said relatively fixed walls, a vent communicating with the interior of said cell through said fixed side wall adjacent the top thereof, and means communicating with the interior of said container for supplying fluid under positive pressure to collapse said flexible walls as fuel is withdrawn from said cell.

5. Fuel storage means comprising a hollow container, a collapsible fuel cell of substantially the same shape and size as the interior of said container, means securing the bottom wall and the upper portion of one side wall of said cell in relatively fixed relation to the corresponding walls of said container, the top wall and the opposite side wall of said cell being flexible and movable to a collapsed position in which they lie in substantial contact with the inner faces of said fixed side and bottom cell walls, fuel supply and discharge means communicating with the interior of said cell through said relatively fixed walls, a vent communicating with the interior of said cell through said fixed side wall adjacent the top thereof, means communicating with the interior of said container for supplying fluid under positive pressure to collapse said flexible walls as fuel is withdrawn from said cell, and means for supplying fluid under a lower positive pressure to said vent and the interior of said cell.

6. Fuel storage means comprising a hollow container, a collapsible fuel cell of substantially the same shape and size as the interior of said container means securing the bottom wall and the upper portion of one side wall of said cell in relatively fixed relation to the corresponding walls of said container, the top wall and the opposite side wall of said cell being flexible and movable to a collapsed position in which they lie in substantial contact with the inner faces of said fixed side and bottom cell walls, fuel supply and discharge means communicating with the interior of said cell through said relatively fixed walls, vent means opening through said one side wall adjacent the top thereof and communicating with the interior of said cell and including means for building up a relatively low positive air pressure therein, and other means communicating with the interior of said container for building up a slightly higher air pressure therein tending to collapse said cell.

7. In combination with an airplane, fuel storage means for said airplane comprising a hollow container carried by said airplane, a collapsible fuel cell of substantially the same shape and size as the interior of said container carried therein, means securing the bottom wall and the upper portion of one side wall of said cell in relatively fixed relation to the corresponding walls of said container, the top wall and the opposite side wall of said cell being flexible and movable to a collapsed position in substantial contact with the inner faces of said fixed side and bottom cell walls, fuel supply and discharge means communicating with the interior of said cell through said relatively fixed walls, vent means opening through said one side wall adjacent the top thereof and communicating with the interior of said cell and the exterior of said airplane and including means responsive to forward movement of the airplane for building up a relatively low positive air pressure within said cell under normal flight conditions, and other means communicating with the interior of said container and the exterior of said airplane and responsive to forward movement of the airplane for building up a slightly greater air pressure within said container under similar flight conditions thus tending to collapse said cell.

8. In combination with an airplane having a fuselage and a wing, fuel storage means for said airplane comprising means forming a hollow container located within said wing, a collapsible fuel cell within said container of a size and shape to substantially conform to the interior of said container, means attaching two adjacent walls of said cell in substantially fixed relation to the corresponding walls of said container, the walls opposite said adjacent walls being free to collapse thereagainst, means for supplying fuel to and withdrawing it from the interior of said cell, vent means opening through one of said fixed cell walls adjacent the top thereof and communicating with the interior of said cell and the exterior of the upper portion of the fuselage of said airplane and including means responsive to forward movement of the airplane for building up a relatively low positive air pressure in said cell under normal flight conditions, and other means communicating with the interior of said container and the exterior of said fuselage for building up a slightly greater air pressure within said container under similar flight conditions tending to collapse said cell.

9. In combination with an airplane, fuel storage means for said airplane comprising a hollow container carried by said airplane, a collapsible fuel cell of substantially the same shape and size as the interior of said container carried therein, means securing the bottom wall and the upper portion of one side wall of said cell in relatively fixed relation to the corresponding walls of said container, the top wall and the opposite side wall of said cell being flexible and movable to a collapsed position in substantial contact with the inner faces of said fixed side and bottom cell walls, fuel supply and discharge means communicating with the interior of said cell through said relatively fixed walls, vent means opening through said one side wall adjacent the top thereof and communicating with the interior of said cell and the exterior of said airplane, and means communicating with the interior of said container and the exterior of said airplane and responsive to forward movement of the airplane for building up a relatively low positive air pressure within said container under normal flight conditions tending to collapse said cell.

FRANCIS J. PEPERSACK.

References Cited in the file of this patent

UNITED STATES PATENTS

| Number | Name | Date |
|---|---|---|
| 1,695,076 | Zohe | Dec. 11, 1928 |
| 2,063,430 | Graser | Dec. 8, 1936 |
| 2,387,598 | Mercier | Oct. 23, 1945 |
| 2,403,749 | O'Neal | July 9, 1946 |
| 2,519,393 | Noyes | Aug. 22, 1950 |
| 2,578,090 | Plumber | Dec. 11, 1951 |

FOREIGN PATENTS

| Number | Country | Date |
|---|---|---|
| 7,709 | Great Britain | 1907 |
| 47,829 | France | Apr. 20, 1937 |
| 467,334 | Great Britain | June 14, 1937 |